(12) United States Patent
Nakano

(10) Patent No.: US 8,352,273 B2
(45) Date of Patent: Jan. 8, 2013

(54) DEVICE, METHOD, AND PROGRAM FOR PERFORMING INTERACTION BETWEEN USER AND MACHINE

(75) Inventor: Mikio Nakano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1288 days.

(21) Appl. No.: 11/989,409

(22) PCT Filed: Jul. 26, 2006

(86) PCT No.: PCT/JP2006/314786
§ 371 (c)(1),
(2), (4) Date: Apr. 11, 2008

(87) PCT Pub. No.: WO2007/013521
PCT Pub. Date: Feb. 1, 2007

(65) Prior Publication Data
US 2010/0131277 A1    May 27, 2010

Related U.S. Application Data

(60) Provisional application No. 60/703,050, filed on Jul. 26, 2005.

(51) Int. Cl.
*G10L 21/00* (2006.01)
*G10L 13/04* (2006.01)

(52) U.S. Cl. .................. 704/270; 704/251; 704/E15.001

(58) Field of Classification Search .................. 704/231, 704/251, 270, 270.1, 275
See application file for complete search history.

(56) References Cited

U.S. PATENT DOCUMENTS

| 7,398,209 B2 * | 7/2008 | Kennewick et al. .......... 704/255 |
| 2004/0064323 A1 | 4/2004 | Kemper et al. |
| 2007/0033005 A1 * | 2/2007 | Cristo et al. .................... 704/9 |

FOREIGN PATENT DOCUMENTS

| JP | 2001-117921 | 4/2001 |
| JP | 2001-343993 | 12/2001 |

(Continued)

OTHER PUBLICATIONS

Nagamori et al., "A Framework for Multi-Domain Conversational Systems", vol. 2000, No. 54, ISSN 0919-6072, SLP-31, Jun. 2000, total of 8 pages.
Kanda et al., "Robust Domain Selection using Dialogue History in Multi-Domain Spoken Dialogue System", vol. 2006, SLP-60, Feb. 2006, total of 6 pages.
Kawaguchi et al., "Design and Evaluation of a Unified Management Architecture for Multi-Domain Spoken Dialogue", vol. 2001, No. 55, ISSN 0919-6072, SLP-36, Jun. 2001, total of 9 pages.

(Continued)

*Primary Examiner* — Angela A Armstrong
(74) *Attorney, Agent, or Firm* — Squire Sanders (US) LLP

(57) ABSTRACT

There is provided a device for performing interaction between a user and a machine. The device includes a plurality of domains corresponding to a plurality of stages in the interaction. Each of the domains has voice comprehension means which understands the content of the user's voice. The device includes: means for recognizing the user's voice; means for selecting a domain enabling the best voice comprehension results as ht domain; means for referencing task knowledge of the domain and extracting a task correlated to the voice comprehension result; means for obtaining a sub task sequence correlated to the extracted task; means for setting the first sub task of the sub task sequence as the sub task and updating the domain to which the sub task belongs as the domain; means for extracting a behavior or sub task end flag correlated to the voice comprehension result and the subtask; and means for causing the machine to execute the extracted behavior.

15 Claims, 4 Drawing Sheets

FOREIGN PATENT DOCUMENTS

| | | |
|---|---|---|
| JP | 2001-356797 | 12/2001 |
| JP | 2003-316385 | 11/2003 |
| JP | 2004-526196 | 8/2004 |
| JP | 2005-164836 | 6/2005 |
| WO | 02/071393 | 9/2002 |

OTHER PUBLICATIONS

Yasuda et at., "Developing a Multi-Domain Dialogue System by the Integration of Single-Domain Systems", vol. 2003, No. 14, ISSN 0919-6072, SLP-45, Feb. 2003, total of 7 pages.

* cited by examiner

DEVICE, METHOD, AND PROGRAM FOR PERFORMING INTERACTION BETWEEN USER AND MACHINE

TECHNICAL FIELD

The present invention relates to a device, method, and program for performing interaction between a user and a machine.

BACKGROUND ART

Conventionally, speech dialog interfaces have been developed as interfaces between robots or machines such as car navigation systems and human users. Machines having dialog interfaces interact with users through dialogs with the users and machines' actions performed based on information obtained from the dialogs.

For example, Japanese Patent Application Publication No. 2003-316385 discloses the following technique. In order to allow free interaction between a user and a machine, a task (domain) corresponding to a speech recognition result of a user's utterance is selected from a plurality of tasks to automatically generate a sequence of dialogs. When the user further utters, a transition takes place to a sequence of dialogs of a corresponding task as necessary, and then the sequence returns to the original sequence.

DISCLOSURE OF THE INVENTION

In the conventional technique, however, a task (domain) is selected according to a speech recognition result of a user's utterance. Thus, in the event of erroneous recognition caused by noise and the like in a vehicle, a transition may take place to an unexpected task (domain) and cause a discrepancy in the context of the dialog, so that the user may be confused.

An object of the present invention is to provide a technique capable of performing interaction between a user and a machine so as to make transitions among multiple domains while maintaining the context of a dialog.

The present invention provides a device for performing interaction between a user and a machine. The device has a plurality of domains corresponding to the multiple phases of the interaction. Each domain includes speech understanding unit for understanding the contents of a speech of the user and outputting a speech understanding result. The device includes a unit for recognizing the speech of the user from a signal detected by a microphone. The device includes a unit that delivers the speech of the user to respective speech understanding means, receives the speech understanding result from each of the speech understanding unit and selects, as a relevant domain, the domain with the speech understanding unit that produced an optimum speech understanding result. The device includes a unit that refers to the task knowledge of the relevant domain out of task knowledges included in the respective multiple domains, and extracts a task associated with the speech understanding result. The device further includes a unit that refers to a subtask knowledge including a plurality of subtasks associated with the kind of task, and determines a sequence of subtasks associated with the extracted task. The device includes a unit that determines the first subtask of the sequence of subtasks as a relevant subtask and updates, as a relevant domain, the domain to which the relevant subtask belongs. The device includes a unit that refers to the action knowledge of the relevant domain out of action knowledges included in the respective multiple domains, and extracts a subtask completion flag or an action associated with the speech understanding result and the subtask. The device includes a unit that causes the machine to execute the extracted action.

This invention makes it possible to smoothly perform interaction between a machine and a person who handles multiple domains.

According to an embodiment of the present invention, the subtask knowledge includes a knowledge about at least one subtask associated with the task and a knowledge about the domain associated with the subtask. Thus the context of the domain can be kept during the implementation of the task.

According to an embodiment of the present invention, each of the speech understanding unit refers to a speech knowledge including a plurality of sentence patterns highly relevant to the corresponding domain, calculates a degree of adaptation between the speech and each of the plurality of sentence patterns, selects the sentence pattern having the highest degree of adaptation, and outputs the selected sentence pattern and the degree of adaptation of the sentence pattern as a speech understanding result. Thus the context of the domain can be kept.

According to an embodiment of the present invention, the selecting unit calculates a degree of reliability by multiplying the degree of adaptation by a weight set for each of the plurality of domains, and selects the domain having the highest degree of reliability as a relevant domain. Thus the context of the domain can be kept.

According to an embodiment of the present invention, when the unit for extracting an action or the subtask completion flag extracts the subtask completion flag, the updating unit updates the subsequent subtask of the relevant subtask in the sequence of subtasks as another relevant subtask and updates, as a relevant domain, the domain to which the another relevant subtask belongs. Thus the task can be smoothly implemented.

Further, the present invention provides a method for performing interaction between a user and a machine. This method includes the steps of recognizing a speech of the user from a signal detected by a microphone, delivering the speech of the user to a plurality of domains corresponding to the multiple phases of the interaction, understanding the contents of the speech in each of the plurality of domains and outputting a speech understanding result, receiving the speech understanding results respectively from the plurality of domains, selecting, as a relevant domain, the domain that produced an optimum speech understanding result out of the plurality of speech understanding results, referring to the task knowledge of the relevant domain out of task knowledges included in the respective multiple domains, and extracting a task associated with the speech understanding result. The method includes the steps of referring to a subtask knowledge including a plurality of subtasks associated with the kind of task, and determining a sequence of subtasks associated with the extracted task, determining the first subtask of the sequence of subtasks as a relevant subtask and updating, as a relevant domain, the domain to which the relevant subtask belongs, referring to the action knowledge of the relevant domain out of action knowledges included in the respective multiple domains, and extracting a subtask completion flag or an action associated with the speech understanding result and the subtask, and causing the machine to execute the extracted action.

Moreover, the present invention provides a program for performing interaction between a user and a machine. This program causes a computer to perform the functions of recognizing a speech of the user from a signal detected by a microphone, delivering the speech of the user to a plurality of domains corresponding to the multiple phases of the interaction with the user, understanding the contents of the speech in each of the plurality of domains and outputting a speech understanding result, receiving the speech understanding results respectively from the plurality of domains, selecting, as a relevant domain, the domain that produced an optimum speech understanding result out of the plurality of speech understanding results. The functions further includes referring to the task knowledge of the relevant domain out of task knowledges included in the respective multiple domains, and extracting a task associated with the speech understanding result, referring to a subtask knowledge including a plurality of subtasks associated with the kind of task, determining a sequence of subtasks associated with the extracted task, determining the first subtask of the sequence of subtasks as a relevant subtask and updating, as a relevant domain, the domain to which the relevant subtask belongs; referring to the action knowledge of the relevant domain out of action knowledges included in the respective multiple domains, extracting a subtask completion flag or an action associated with the speech understanding result and the subtask, and causing the machine to execute the extracted action. This program is recorded on a recording medium readable by the computer.

DESCRIPTION OF SYMBOLS

Figure 1:
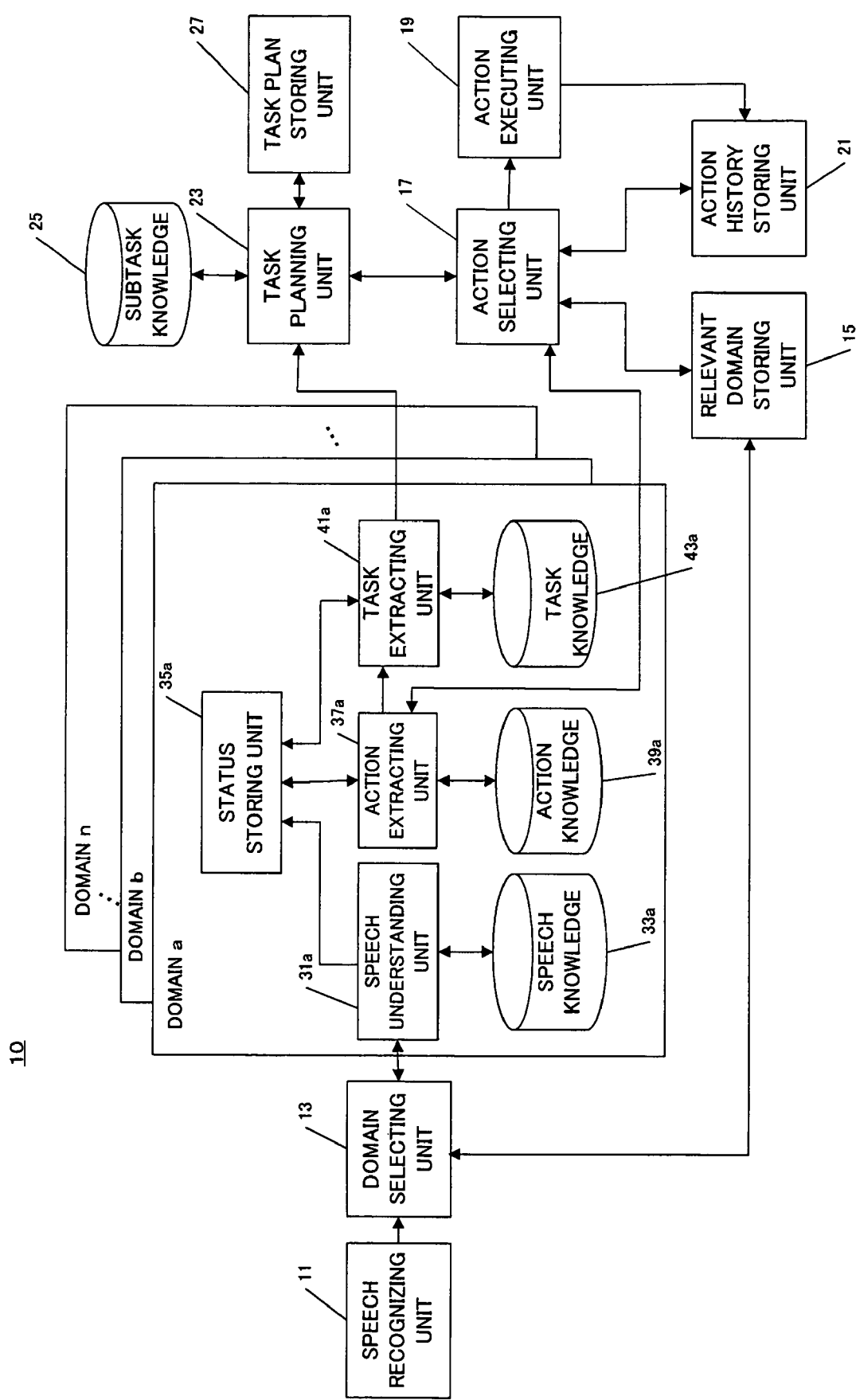
FIG. 1 is a functional block diagram of a speech interactive device.

10 Speech interactive device
11 Speech recognizing unit
13 Domain selecting unit
17 Action selecting unit
19 Action executing unit
23 Task planning unit
25 Subtask knowledge
31a to 31n Speech understanding unit
37a to 37n Action extracting unit
41a to 41n Task extracting unit
43a to 43n Task knowledge

BEST MODE FOR CARRYING OUT THE INVENTION

1. Outline

Exemplary embodiments of the present invention will now be described with reference to the accompanying drawings. FIG. 1 is a functional block diagram showing a speech interactive device 10 according to an embodiment of the present invention.

The speech interactive device 10 may be realized by, for example, a microcomputer including a CPU for performing various operations, a memory for temporarily storing the results of operations, a ROM for storing learning results and the like, and an interface for inputting and outputting data. Some or all of the functional blocks of the speech interactive device 10 in FIG. 1 can be realized by any one of software, firmware, and hardware.

The speech interactive device 10 is a device for performing interaction between a human user and a machine. The speech interactive device 10 receives a human user's speech from speech detecting unit (not shown) such as a microphone provided in the machine and transmits an action instruction to the uttering means or moving means (not shown) of the machine.

"Machine" in the present invention includes a robot, a car navigation system, and an electric appliance in which voice is used as an interface.

The speech interactive device 10 may be installed in a machine or communicate with a machine through wire or wireless communications from the outside of the machine.

The speech interactive device 10 includes a plurality of domains "a" to "n".

"Domains" in the present invention includes multiple phases that compose an interaction between a human user and a machine.

In the present embodiment, the domains "a" to "n" are broadly divided into "request understanding domains" which perform interaction for understanding the kind of request from a human user and "non-request understanding domains" which perform actions in response to a request from a human user.

The "request understanding domains" estimate the contents of a human utterance and understand a request such as "call a person" from a human user through dialogs which may include questions about uncertain matters. The request understanding domains include, in addition to "call a person", various domains corresponding to the contents of requests. The optimum one of the multiple request understanding domains is selected for the contents of a user utterance. The domain is selected through an utterance understanding operation to be discussed later. The content of a user's request is understood by selecting one of the request understanding domains.

"Non-request understanding domains" include various domains corresponding to the contents of actions such as "acquire information about a target position", "move to a target position", and "deliver a message".

The plurality of domains "a" to "n" include speech understanding units 31a to 31n, speech knowledges database 33a to 33n, status storing units 35a to 35n, action extracting units 37a to 37n, action knowledge database 39a to 39n, task extracting units 41a to 41n, and task knowledge database 43a to 43n. In the speech knowledge database, action knowledge database, and task knowledge database, highly relevant sentence patterns, actions and tasks are respectively stored according to the kinds of domains.

In the present embodiment, "task", "subtask" and "action" are hierarchically used. First, a domain selecting unit 13 selects an optimum request understanding domain for the content of a user utterance, and a task extracting unit (one of 41a to 41n) of the selected domain (one of the domains "a" to "n", hereinafter is referred to as a "relevant domain") extracts a "task" to be performed by a robot to satisfy the contents of a user request. Next, a task planning unit 23 determines a sequence of "subtasks" for performing the extracted "task". Then, an action selecting unit 17 selects an "action" for performing the "subtasks" according to the sequence of "subtasks". In other words, the contents of "task", "subtask" and "action" are subdivided in the order of task, subtask, and action.

Processing performed in the speech interactive device 10 is divided into "understanding of an utterance" and "selection of an action". "Understanding of an utterance" is mainly performed by a speech recognizing unit 11, the domain selecting unit 13, the speech understanding units 31a to 31n of the respective domains, and a relevant domain storing unit 15. "Selection of an action" is mainly performed by an action selecting unit 17, an action executing unit 19, an action history storing unit 21, the relevant domain storing unit 15, the action extracting unit (one of 37a to 37n) of the relevant domain, the task extracting unit (one of 41a to 41n), and the task planning unit 23. The details of "understanding of an utterance" and "selection of an action" will now be discussed.

2. Understanding of Utterance

Figure 2:
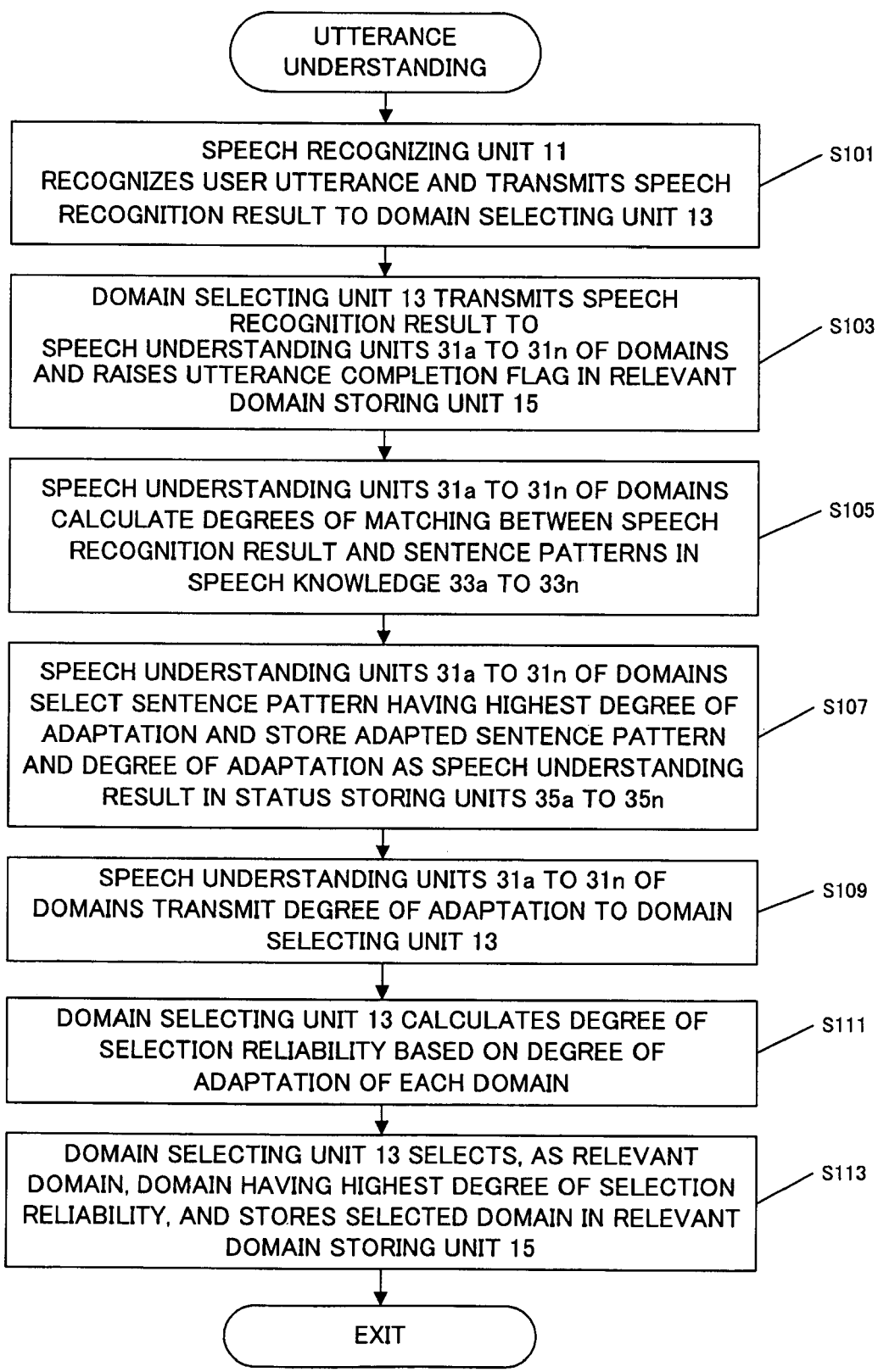
FIG. 2 is a flowchart showing the understanding of an utterance.

Referring to FIG. 2, understanding of an utterance in the speech interactive device 10 will be described below. FIG. 2 is a flowchart showing the understanding of an utterance.

In step S101, when a user utterance is inputted from a detecting unit (not shown) such as a microphone, the speech recognizing unit 11 recognizes the speech. The speech recognizing unit 11 outputs a speech recognition result in a form of a degree of reliability on a recognition result of a word sequence and each word, by using a known technique such as a hidden Markov model. The degree of reliability generally ranges from 0 to 1. Each word included in a word sequence may have multiple candidates. A speech under noise may be extracted from an input signal from a microphone by a known technique such as beam forming, and then the extracted speech may be recognized.

In step S103, the domain selecting unit 13 transmits the speech recognition result to the speech understanding units 31a to 31n of the domains "a" to "n". Further, the domain selecting unit 13 sets an utterance completion flag in the relevant domain selecting unit 15 for a predetermined period (e.g., three seconds) from a time when the speech recognition result is received from the speech recognizing unit 11.

In step S105, the speech understanding units 31a to 31n of the domains calculate the "degrees of matching" between a word sequence included in the speech recognition result inputted from the domain selecting unit 13 and sentence patterns provided in the speech knowledge database 33a to 33n prepared for the respective domains.

The speech knowledge database 33a to 33n includes multiple "sentence patterns" prepared for the respective domains to understand the speech recognition result. For example, the "sentence patterns" include "Tell me <information type> at <location> on <date>." The sentence pattern of this example includes three categories of <date>, <location> and <information type>. Each category has a corresponding key word list.

When a word included in the speech recognition result matches with a keyword prepared for each category of a sentence pattern, it is adapted to that category. The "degree of adaptation" is, for example, the number or ratio of categories matched with words out of categories included in a sentence pattern.

For example, when a speech recognition result of "Tell me tomorrow's whether" is adapted to a sentence pattern of "Tell me <information type> at <location> on <date>", <date> matches with tomorrow, <location> is blank, and <information type> matches with the weather. At this point, two of the three categories matches with the speech recognition result, so that the degree of adaptation is represented as "2" or "2/3".

In step S107, the speech understanding units 31a to 31n select a sentence pattern having the highest degree of adaptation. Then, the degree of adaptation between the selected sentence pattern and a sentence obtained by allocating the matching words to the categories of the selected sentence pattern (hereinafter, will be referred to as a "adapted sentence pattern") is stored as a "speech understanding result" in the status storing unit 35a to 35n.

The "adapted sentence pattern" is represented as below:

"Tell me <information type=weather> at <location="blank"> on <date=tomorrow>" according to the above example. Further, the "adapted sentence pattern" may include a degree of reliability of each word. For example, assuming that the degree of reliability of "tomorrow" is 0.9 and the degree of reliability of "weather" is 0.7 in speech recognition, the adapted sentence pattern is represented as below:

"Tell me <information type=weather(0.7)> at <location="blank"(0.0)> on <date=tomorrow(0.9)>"

In step S109, the speech understanding units 31a to 31n deliver the degree of adaptation of the selected sentence pattern to the domain selecting unit 13.

In step S111, the domain selecting unit 13 calculates the "degree of selection reliability" based on the degree of adaptation from the speech understanding units 31a to 31n of the respective domains.

The "degree of selection reliability" is calculated by multiplying a "weight" by the degree of adaptation. A weight is set for each domain.

A value larger than 1 is set as the "weight" of the relevant domain stored in the relevant domain storing unit 15 and 1 is set as the weights of the other domains because it is presumed that the dialog and action of the relevant domain are likely to be repeatedly performed. The relevant domain is a domain where a user utterance issued immediately before or a subtask belongs.

When there is no relevant domain, all the weights are set at an equal value (e.g., 1).

In the case of a request understanding domain, the weight of the relevant domain may be set slightly larger than those of the other domains. In the case of a non-request understanding domain, the weight of the relevant domain may be set larger than those of the other domains. With these weights, the request selection domain is hard to fix and the other domains are easily fixed because it is presumed that in many cases, a user request has to be understood by trial and error in dialogs but once the request is understood, the context of the subsequent dialog and action is easily fixed.

In step S113, the domain selecting unit 13 selects the domain having the highest degree of selection reliability as a relevant domain, and stores information about the selected domain in the relevant domain storing unit 15. When multiple domains have an equal degree of reliability, one of the domains is selected as a relevant domain. By guessing the domain thus, a relevant domain can be easily selected. The domain having the highest degree of adaptation may be selected as a relevant domain without calculating the degree of selection reliability.

The above explanation described understanding of a speech in the speech interactive device 10.

After an inputted user utterance is understood thus, the "relevant domain" indicating the domain of a dialog/action performed by the on-going system and the "utterance completion flag" indicating the completion of understanding of the user utterance are stored in the relevant domain storing unit 15.

Further, "speech understanding results" are stored in the status storing units 35a to 35n of the respective domains. The speech understanding results include the adapted sentence pattern of the sentence pattern having the highest degree of adaptation and the degree of adaptation.

3. Action Selection

Figure 3:
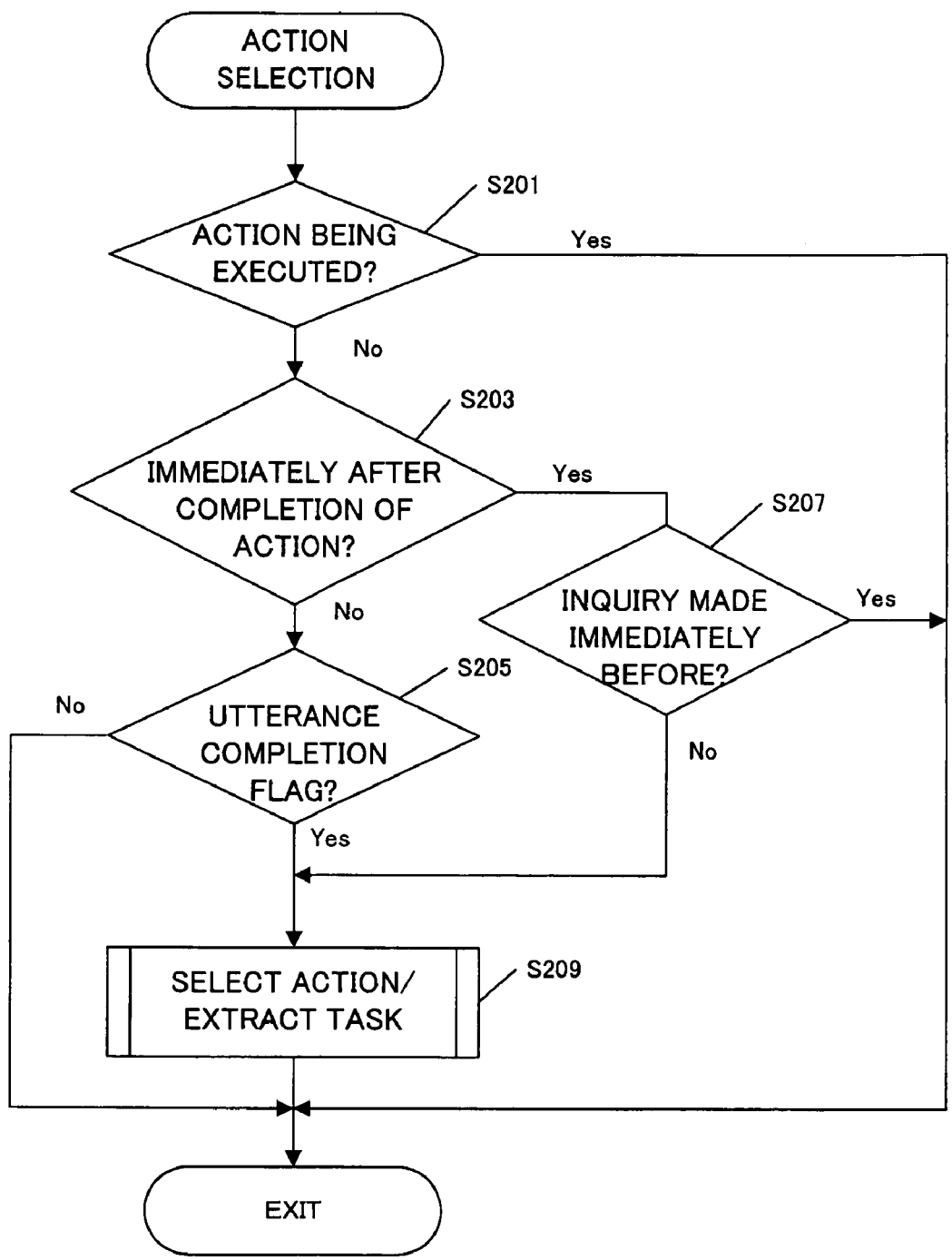
FIG. 3 is a flowchart showing the selection of an action.
Figure 4:
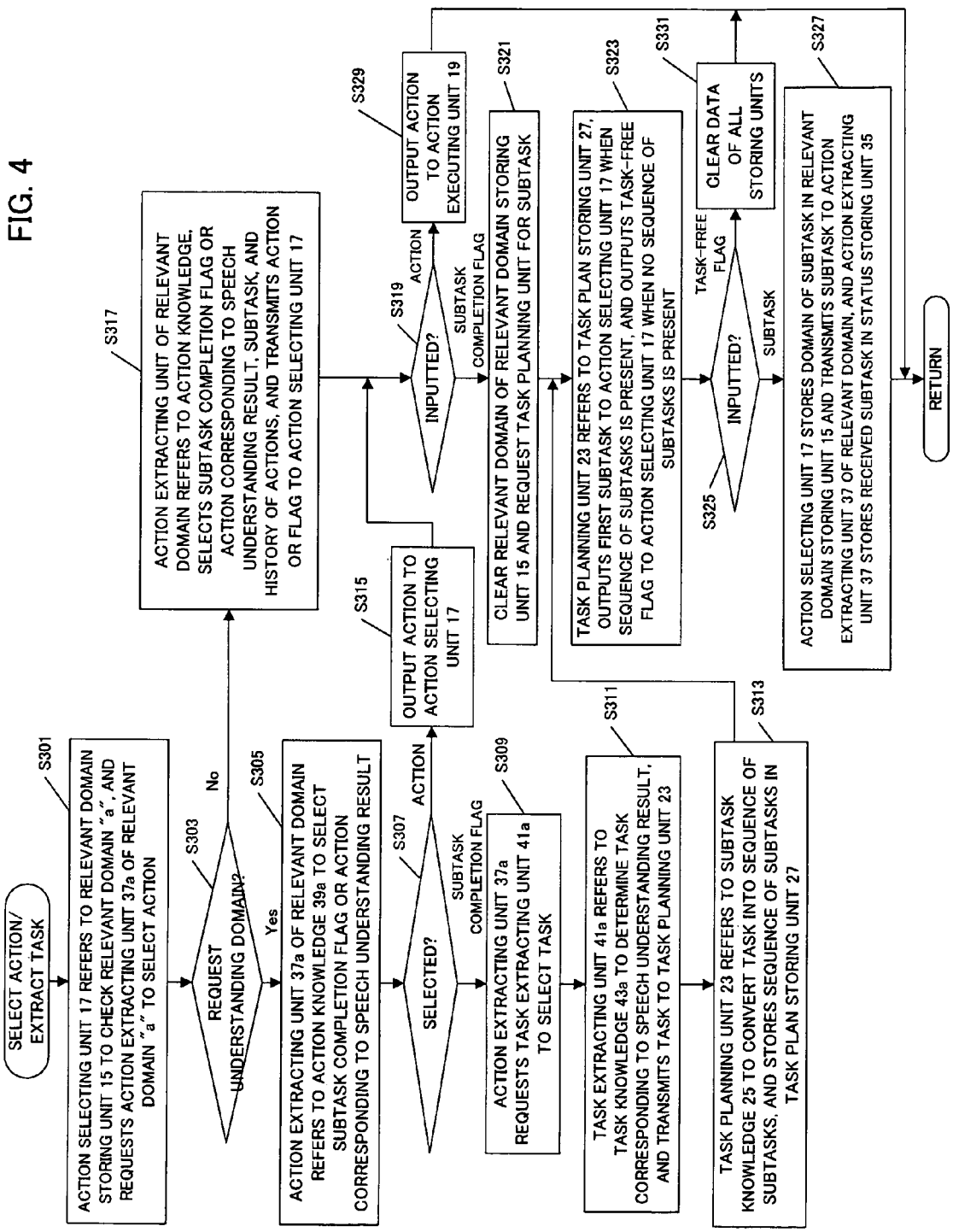
FIG. 4 is a flowchart showing action execution/task extraction in step S209.

Referring to FIGS. 3 and 4, the selection of an action in the speech interactive device 10 will be described below. FIG. 3 is a flowchart showing the selection of an action.

The selection of an action in FIG. 3 is performed by the action selecting unit 17 in a predetermined period (e.g., 100 milliseconds).

In step S201, the action selecting unit 17 refers to the action history storing unit 21 to confirm whether or not a robot has performed an action. In the action history storing unit 21, "an action performed immediately before", "the start time of the action" and "the finishing time of the action" are recorded. When the action is underway, the finishing time is not recorded. Thus the action selecting unit 17 recognizes whether the action is underway or not, by confirming the presence or absence of "the finishing time of the action" in the action history storing unit 21. When the action is not underway, the process advances to step S203. When the action is underway, the processing of the current period is completed and the action selecting unit 17 stands by until the subsequent period.

In step S203, the action selecting unit 17 confirms whether or not the robot has completed the action immediately before. In this processing, for example, the action selecting unit 17 refers to "the finishing time of the action" in the action history storing unit 21 to confirm whether or not the current time is a predetermined elapsed time from "the finishing time of the action". When the action has not been completed immediately before, the process advances to step S205. When the action has been completed immediately before, the process advances to step S207.

In step S205, the action selecting unit 17 refers to the utterance completion flag of the relevant domain storing unit 15 to confirm whether or not a user utterance has been completed. When the utterance is completed, the process advances to step S209 to "select an action/extract a task". When the utterance has not been completed, the processing of the current period is completed and the action selecting unit 17 stands by until the subsequent period.

In step S207, the action selecting unit 17 refers to "the action performed immediately before" in the action history storing unit 21 to confirm whether or not the action performed immediately before is "a question to a user". When the action performed immediately before is not "a question to a user", the process advances to step S209 to "select an action/extract a task". When the action performed immediately before is "a question to a user", the processing of the current period is completed and the action selecting unit 17 stands by until the subsequent period.

FIG. 4 is a flowchart showing the execution of an action/extraction of a task in step S209.

For convenience of explanation, the domain "a" is selected as a relevant domain in the following processing. In actual processing, a relevant domain is properly selected from the domains "a" to "n".

In the execution of an action/extraction of a task, the following steps are implemented.

(1) The action selecting unit 17 refers to the relevant domain storing unit 15 to check the relevant domain "a" and requests an action extracting unit 37a of the relevant domain to select an action (step S301).

(2) When the action selecting unit 17 requests the selection of an action, the action extracting unit 37a of the relevant domain "a" performs the following processing:

(2-1) When the relevant domain "a" is an understanding request domain (YES in step S303), a) the action extracting unit 37a refers to an action selection rule in the action knowledge 39a to select an action corresponding to the speech understanding result of the status storing unit 35a or select the subtask completion flag (step S305).

In this case, the action selection rule indicates the relationship between an action or the subtask completion flag and some or all of the speech understanding results that are stored in the status storing units 35a to 35n, the relevant subtask, and the history of actions. The action selection rule is generally used for action selection in the research field of speech interaction.

For example, the action selection rule includes "generate an action asking what is in a "blank" in the sentence pattern of a speech understanding result", "select the subtask completion flag for a satisfactory speech understanding result (with an excellent matching status and a high degree of adaptation)", "generate an utterance for requesting repetition when a speech understanding result is not satisfactory and an action immediately before in the history of actions is a question to a user", and "generate an utterance for requesting another utterance when a speech understanding result is not satisfactory and an action immediately before in the history of actions is understanding to a user".

Further, the action knowledge includes "knowledge about language generation". When the selected action relates to an utterance such as "generate an action asking what is in a blank", the action and the sentence of the utterance are associated with each other.

b) When an action is selected, the action is outputted to the action selecting unit 17 (step S315).

c) When the subtask completion flag is selected, the action extracting unit 37a requests the task extracting unit 41a to select a task (step S309).

d) The task extracting unit 41a refers to a task extraction rule in the task knowledge 43a and outputs a task corresponding to a speech understanding result to the task planning unit 23 (step S311).

In this case, the task extraction rule indicates the relationship between speech understanding results stored in the status storing units 35a to 35n and the task to be outputted to the task planning unit. For example, in "the domain "a" for understanding a request to call a person", an output task of <task=call a person, person=<person>> is associated with a speech recognition result which includes a adapted sentence pattern having a word matched with a category of "person" in a sentence pattern of "call <person>".

e) The task planning unit 23 converts the task into a sequence of subtasks by using subtask knowledge 25 and stores the sequence of subtasks in the task plan storing unit 27 (step S313).

The subtask knowledge 25 has knowledge (rule) for dividing a task into subtasks, and the subtasks are associated with the respective domains.

A task is divided into subtasks as follows:

A task of <task=call, person=<X>> is divided into a sequence of subtasks of:

(i) <subtask=locate a person, person=X>
(ii) <subtask=come close to a person, person=X>
(iii) <subtask=inform a call, person=X>.

Each subtask is associated with a domain. For example, the subtask (i) corresponds to "an information acquisition domain for locating a person", the subtask (ii) corresponds to "a moving domain", and the subtask (iii) corresponds to "a domain providing information about a call".

(2-2) When the relevant domain is a non-understanding request domain (NO in step S303), the action extracting unit 37a refers to the action selection rule (specifically described in (2-1), a)) in the action knowledge 39a, selects the subtask completion flag or an action that corresponds to the speech understanding result of the status storing unit 35a, the relevant subtask, and the history of actions, and outputs the selected action or flag to the action selecting unit 17 (step S317).

(3) Upon input of an action or the subtask completion flag from the action extracting unit 37a (step S319), (3-1) when an action is inputted, the action selecting unit 17 outputs the action to the action executing unit 19 (S329). When the action is inputted from the action selecting unit 17, the action executing unit 19 performs the action and stores the execution start time in the action history storing unit 21. At the completion of the action, the action and the execution completion time are stored in the action history storing unit 21.

(3-2) When the subtask completion flag is inputted, the action selecting unit 17 clears the relevant domain of the relevant domain storing unit 15 and requests a subtask from the task planning unit 23 (step S321).

a) The task planning unit 23 refers to a task plan storing unit 27. When a sequence of subtasks is present, the first subtask is outputted to the action selecting unit 17. When a sequence of subtasks is not present, a task-free flag is outputted to the action selecting unit 17 (step S323).

b) When a subtask is inputted, the domain (one of a to n) of the subtask is stored as a relevant domain in the relevant domain storing unit 15 and the subtask is outputted to the action extracting unit (one of 37a to 37n) of the relevant domain. The action extracting unit (one of 37a to 37n) of the relevant domain stores the relevant subtask in the status storing unit (one of 35a to 35n) (step S327).

c) When the task-free flag is delivered, data is deleted in all the storing units (step S331).

The above explanation described the selection of an action with reference to FIGS. 3 and 4.

When an action is selected, "subtasks" are stored in the status storing units 35a to 35n of the respective domains, in addition to "speech understanding results" including the adapted sentence pattern of the sentence pattern having the highest degree of adaptation and the degree of adaptation.

A sequence of subtasks is stored in the task plan storing unit 27.

In the action history storing unit 21, "an action performed immediately before" and "the execution finishing time of the action" are stored.

Further, the relevant domain of the relevant domain storing unit 15 may be updated.

4. Embodiments 4.1 Outline

An embodiment of interaction through a dialog of a robot having four domains "a" to "d" and a user (Mr. Henry) will now be described.

In this example, the four domains "a" to "d" of the robot are "the request understanding domain "a" for calling a person", "the information acquisition domain "b" for locating a person", "the domain "c" for movement", and "the domain "d" for providing information about a call".

It is assumed that the robot and Mr. Henry carry on a dialog as follows:

Mr. Henry: "Call for Mr. Zidane."
Robot: "Where is Mr. Zidane?"
Mr. Henry: "Dressing Room."
Robot: "One more time, please."
Mr. Henry: "Dressing room."
Robot: "I understand."
(Starts Moving to MR. Zidane)
Robot: "Mr. Henry is calling for you."

Processing performed in the speech interactive device 10 during this dialog will be discussed below.

4.2 Understanding of Utterance

In the initial state, all the storing units are empty.

When Mr. Henry utters "Call for Mr. Zidane" and the utterance is inputted from a microphone, the speech recognizing unit 11 recognizes a word sequence of "Call for", "Mr." and "Zidane" and outputs the word sequence to the domain selecting unit together with a degree of reliability of each word (0 to 1). In this case, the speech was recognized well and each word was recognized with a high degree of reliability.

The domain selecting unit 13 transmits the word sequence to the speech understanding units 31a to 31d of the domains "a" to "d" and raises the utterance completion flag in the relevant domain storing unit 15 for a predetermined period.

The speech understanding units 31a to 31d match the word sequence with the sentence patterns in the speech knowledge database 33a to 33d.

For example, "the request understanding domain a for calling for a person" has a sentence pattern of "<call for>" "<person>" and thus the word sequence is tried to adapt to the sentence pattern. In this case, a keyword list in <person> category matches with "Mr." and "Zidane". Thus "person=Mr. Zidane" is inputted and <call for> also matches with "call for".

In this case, the words match with all the (two) categories included in the sentence pattern and the degrees of reliability of "Mr.", "Zidane" and "call" are high, so that a high degree of adaptation is given.

This sentence pattern is found to have the highest degree of adaptation as a result of matching with the other sentence patterns of "the request understanding domain a for calling for a person". Thus the adapted sentence pattern "<call for> <person=Mr. Zidane>" and the degree of adaptation are stored as a speech recognition result in the status storing unit 35a, and the degree of adaptation is outputted to the domain selecting unit 13.

The other three domains "b" to "d" are similarly processed.

The domain selecting unit 13 calculates the degrees of domain selection reliability based on the degrees of matching from the speech understanding units 31a to 31d of the domains "a" to "d". Further, the domain selecting unit 13 selects the domain having the highest degree of selection reliability, as a relevant domain to be stored in the relevant domain storing unit 15.

In the case of this utterance, no relevant domain is recorded in the relevant domain storing unit 15 and "the request understanding domain a for calling for a person" has the highest degree of adaptation. Thus the domain "a" is recorded as a relevant domain.

4.3 Task Extraction

The action selecting unit 17 refers to the action history storing unit 21 every 100 milliseconds.

At this point, nothing is stored in the action history storing unit 21. Thus the action selecting unit 17 decides that the robot is not in action or has not completed any action immediately before.

Then, at the detection of the utterance completion flag of the relevant domain storing unit 15, the action selecting unit 17 decides that an utterance has been completed. After that, the action selecting unit 17 selects an action.

In the selection of an action, the action selecting unit 17 refers to the relevant domain storing unit 15 and requests the action extracting unit 37*a* of the "request understanding domain a for calling for a person" to select an action. The domain "a" serves as a relevant domain.

Since the relevant domain is a request understanding domain, the action extracting unit 37*a* compares the speech recognition result in the status storing unit 35*a* and the action extraction rule in the action knowledge 39*a*.

In this case, the speech understanding result is satisfactory and thus the subtask completion flag is selected.

Then, the speech recognition result is compared with the task extraction rule of the task knowledge 43*a*, a rule of <task=call for, person=<person>> is selected, a task of <task=call for, person=Mr. Zidane> is obtained, and the task is outputted to the task planning unit 23.

The task planning unit 23 receives the task, refers to a subtask knowledge 25 to divide the task into a sequence of subtasks, stores the subtasks in the task plan storing unit 27, and outputs the first subtask (i) to the action selecting unit 17.

(i)<subtask=locate a person, person=Mr. Zidane> . . . domain b (ii)<subtask=come close to a person, person=Mr. Zidane> . . . domain c (iii)<subtask=inform being called for, person=Mr. Zidane> . . . domain d The action selecting unit 17 stores, in the relevant domain storing unit 15, "the information acquisition domain b for locating a person" that is the domain of the subtask (i), and outputs the subtask (i) to the action extracting unit 37*b* of the relevant domain.

The action extracting unit 37*b* of the relevant domain stores the inputted subtask (i) in the status storing unit 37*b*.

4.4 Action Selection 1

The action selecting unit 17 (after 100 milliseconds) refers to the action history storing unit 21 and the relevant domain storing unit 15 to detect the user utterance completion flag, and then selects an action.

The action selecting unit 17 refers to the relevant domain storing unit 15 to obtain "the information acquisition domain b for locating a person" that is a relevant domain, and the action selecting unit 17 requests the action extracting unit 37*b* of the relevant domain to select an action.

The action extracting unit 37*b* of the relevant domain refers to the action selection rule in the action knowledge 39*b* to select an action corresponding to a speech understanding result and the subtask (i).

In the status storing unit 35*b* of the relevant domain, a speech understanding result of "<person=Mr. Zidane> is in <location="blank">" is stored, and the subtask is:

(i)<subtask=locate a person, person=Mr. Zidane>

Thus a rule "action=ask for a location, person=<person>" is selected and an action of <action=ask for a location, person=Mr. Zidane> is obtained.

This action is converted by a language generating knowledge in the action knowledge 39*b* into the following sentence:
"Where is Mr. Zidane?"

Then, the sentence is outputted to the action selecting unit 17.

The action selecting unit 17 outputs this action (sentence) to the action executing unit 19.

The action executing unit 19 utters "Where is Mr. Zidane?" and stores the action of making an inquiry to a user and the execution completion time in the action history storing unit 21.

When a user replies "Dressing room", the speech recognizing unit 11 recognizes that the user said "Mr. Zidane", with a low evaluation value.

The domain selecting unit 13 transmits this recognition result to the speech understanding units 31*a* to 31*d* of the respective domains and raises the utterance completion flag in the relevant domain storing unit 15.

Since this utterance has a low evaluation value, a low degree of adaptation is calculated in all the domains.

Because of the low degree of adaptation, the speech understanding units of all the domains detect erroneous recognition, store the erroneous recognition together with the degree of adaptation in the status storing units 35*a* to 35*d*, and output the degree of adaptation to the domain selecting unit 13.

The domain selecting unit 13 refers to the relevant domain stored in the relevant domain storing unit 15, recognizes that the relevant domain is "the information acquisition domain b for locating a person" and calculates the degree of selection reliability of the domain with an increased weight. Consequently, "the information acquisition domain b for locating a person" was selected again and thus the relevant domain of the relevant domain storing unit 15 is not updated.

The action selecting unit 17 recognizes that the action has been completed immediately before and the user utterance has been completed, and then selects an action.

The action selecting unit 17 refers to the relevant domain storing unit 15, recognizes that the relevant domain is "the information acquisition domain b for locating a person", and requests the action extracting unit 37*b* of the relevant domain to select an action.

The action extracting unit 37*b* of the relevant domain refers to the speech recognition result of "erroneous recognition" and the low degree of adaptation in the status storing unit 35*b* and refers to the action selection rule, so that the action extracting unit 37*b* selects the action below:

<Action=generate an utterance for requesting repetition, the other party=user>.

Further, the action extracting unit 37*b* refers to the language generating knowledge in the action knowledge 39*b* and converts the action into the sentence below:
"Where is Mr. Zidane?"

Then, the action extracting unit 37*b* outputs the sentence to the action selecting unit 17.

The action selecting unit 17 outputs this sentence to the action executing unit 19.

The action executing unit 19 utters "One more time, please" and stores the action of asking a favor (asking the question again) to a user and the execution completion time in the action history storing unit 21.

When the user utters "Dressing room" again, the utterance is recognized with a high evaluation value.

Similar processing is performed, the utterance completion flag is raised in the relevant domain storing unit 15, and a adapted sentence pattern of "<person=Mr. Zidane> is in <"location=dressing room">" is stored as a speech understanding result in the status storing unit 35b with a high degree of adaptation.

Since the relevant domain "b" has the highest degree of adaptation, the domain selecting unit 13 does not update the relevant domain of the relevant domain storing unit 15.

At the detection of the utterance completion flag of the relevant domain storing unit 15, the action selecting unit 17 decides that the utterance has been completed and selects an action.

The action selecting unit 17 recognizes that the relevant domain is "the information acquisition domain b for locating a person" and requests the action extracting unit 37b of the relevant domain to select an action.

The action extracting unit 37b refers to the satisfactory speech recognition result of "<person=Mr. Zidane> is in <location=dressing room>" and the subtask (i)<subtask=locate a person, person=Mr. Zidane>. Since the words are matched with all the categories of the sentence pattern with a high degree of adaptation, the subtask completion flag is outputted to the action selecting unit 17.

In response to the subtask completion flag, the action selecting unit 17 clears "the information acquisition domain b for locating a person" that is the relevant domain of the relevant domain storing unit 15 and requests the task planning unit 23 for a subtask.

The task planning unit 23 refers to the task plan storing unit 27 and outputs the following subtask (ii) to the action selecting unit 17.

(ii)<subtask=come close to a person, person=Mr. Zidane>"domain c for movement".

The action selecting unit 17 stores "domain c for movement" as a relevant domain in the relevant domain storing unit 15, and outputs the subtask (ii) to the action extracting unit 37c of the relevant domain.

The action extracting unit 37c of the relevant domain stores the subtask (ii) in the status storing unit 35c.

4.5 Action Selection 2

The action selecting unit 17 (after 100 milliseconds) refers to the action history storing unit 21 and the relevant domain storing unit 15 again to detect the raised utterance completion flag, and then selects an action.

The action selecting unit 17 requests the action extracting unit 37c of "domain c for movement" to select an action. The domain "c" serves as a relevant domain.

The action extracting unit 37c of the relevant domain refers to:

the speech recognition result of "<person=Mr. Zidane> is in <location=dressing room>" in the status storing unit 35c, and the subtask (ii)<subtask=come close to a person, person=Mr. Zidane>, select the action selection rule of <action=move after generating an utterance of understanding, location=<location>>, obtains an action of <action=move after generating an utterance of understanding, location=dressing room>, and outputs the action to the action selecting unit 17.

The action selecting unit 17 outputs the action to the action executing unit 19.

The action executing unit 19 utters "I understand" and then moves the robot to the dressing room. When the robot reaches the location, the movement as a relevant action and the execution completion time are stored in the action history storing unit 21.

4.6 Action Selection 3

After a few minutes, the action selecting unit 17 detects the completion of the action and selects an action.

The action selecting unit 17 requests the action extracting unit 37c of "the domain c for movement" to select an action. The domain "c" serves as a relevant domain.

The action extracting unit 37c of the relevant domain refers to (ii)<subtask=come close to a person, person=Mr. Zidane> in the status storing unit 35c, the history of actions of the action history storing unit 21, and the action selection rule, selects the subtask completion flag, and outputs the flag to the action selecting unit 17.

The action selecting unit 17 clears "the domain c for movement" in the relevant domain storing unit 15 and requests the task planning unit 23 for a subtask.

The task planning unit 23 refers to the task plan storing unit 27 and outputs, to the action selecting unit 17, the subtask below:

(iii)<subtask=inform being called for, person=Mr. Zidane>"the domain d for providing information about a call".

The action selecting unit 17 stores the "domain d for providing information about a call" in the relevant domain storing unit 15, and outputs the subtask (iii) to the action extracting unit 37d of the relevant domain.

The action extracting unit 37d stores the subtask (iii) in the status storing unit 35d.

The action selecting unit 17 refers to the action history storing unit 21 and recognizes that an action has been completed immediately before, and then the action selecting unit 17 selects an action.

The action selecting unit 17 requests the action extracting unit 37d of the "domain d for providing information about a call" to select an action. The domain "d" serves as a relevant domain.

The action extracting unit 37d of the relevant domain compares (iii)<subtask=inform being called for, person=Mr. Zidane> in the status storing unit 35d with the action selection rule and obtains the action below:

<Action=generate an utterance for informing a person, person=Mr. Zidane>.

Further, the action extracting unit 37d refers to the language generating knowledge in the action knowledge 39d and converts the action into the uttered sentence below:

"Mr. Henry is calling for you."

Then, the action extracting unit 37d outputs the sentence to the action selecting unit 17.

The action selecting unit 17 outputs this sentence to the action executing unit 19.

The action executing unit 19 utters "Mr. Henry calls for you" and stores the action of informing a person and the execution completion time in the action history storing unit 21.

4.7 Action Selection 4

The action selecting unit 17 refers to the action history storing unit 21 and recognizes that an action has been completed, and then the action selecting unit 17 selects an action.

The action selecting unit 17 requests the action extracting unit 37d of "the domain "d" for providing information about a call" to select an action. The domain "d" serves as a relevant domain.

The action extracting unit 37*d* of the relevant domain compares (iii)<subtask=inform being called for, person=Mr. Zidane> and the history of actions with the action selection rule, selects the subtask completion flag, and outputs the flag to the action selecting unit 17.

The action selecting unit 17 clears the "domain "d" for providing information about a call" in the relevant domain storing unit 15 and requests the task planning unit 23 for a subtask.

The task planning unit 23 refers to the task plan storing unit 27. Since no subtask is present, the task-free flag is outputted to the action selecting unit 17.

In response to the task-free flag, the action selecting unit 17 clears data in all the storing units.

The present invention was described in accordance with the specific embodiments but is not limited to these embodiments.

The invention claimed is:

1. A device for performing interaction between a user and a machine, the device having a plurality of domains corresponding to multiple phases of the interaction, each domain including speech understanding means for understanding content of a speech of the user and outputting a speech understanding result, the device comprising:
    means for recognizing the speech of the user from a signal detected by a microphone;
    means for delivering the speech of the user to the respective speech understanding means, receiving the speech understanding result from each of the speech understanding means and selecting, as a relevant domain, the domain having the speech understanding means that produced an optimum speech understanding result;
    means for referring to a task knowledge of the relevant domain out of task knowledges included in the respective multiple domains, and extracting a task associated with the speech understanding result;
    means for referring to a subtask knowledge including a plurality of subtasks associated with the kind of task, and determining a sequence of subtasks associated with the extracted task;
    means for determining a first subtask of the sequence of subtasks as a relevant subtask and updating, as the relevant domain, the domain to which the relevant subtask belongs;
    means for referring to an action knowledge of the relevant domain out of action knowledges included in the respective multiple domains, and extracting a subtask completion flag or an action associated with the speech understanding result and the subtask; and
    means for causing the machine to execute the extracted action.

2. The device according to claim 1, wherein the subtask knowledge includes a knowledge about at least one subtask associated with the task and a knowledge about the domain associated with the subtask.

3. The device according to claim 1, wherein each of the speech understanding means refers to a speech knowledge including a plurality of sentence patterns relevant to the corresponding domain, calculates a degree of adaptation between the speech and each of the plurality of sentence patterns, selects the sentence pattern having a highest degree of adaptation, and outputs the selected sentence pattern and the degree of adaptation of the sentence pattern as a speech understanding result.

4. The device according to claim 3, wherein the selecting means calculates a degree of reliability by multiplying the degree of adaptation by a weight set for each of the plurality of domains, and selects the domain having a highest degree of reliability as the relevant domain.

5. The device according to claim 1, wherein when the means for extracting an action or the subtask completion flag extracts the subtask completion flag, the updating means updates a subsequent subtask of the relevant subtask in the sequence of subtasks as another relevant subtask and updates, as the relevant domain, the domain to which the another relevant subtask belongs.

6. A method for performing interaction between a user and a machine, comprising the steps of:
    recognizing a speech of the user from a signal detected by a microphone;
    delivering the speech of the user to a plurality of domains corresponding to multiple phases of the interaction;
    understanding content of the speech in each of the plurality of domains and outputting a speech understanding result;
    receiving the speech understanding results respectively from the plurality of domains;
    selecting, as a relevant domain, the domain that produced an optimum speech understanding result out of the plurality of speech understanding results;
    referring to a task knowledge of the relevant domain out of task knowledges included in the respective multiple domains, and extracting a task associated with the speech understanding result;
    referring to a subtask knowledge including a plurality of subtasks associated with the kind of task, and determining a sequence of subtasks associated with the extracted task;
    determining a first subtask of the sequence of subtasks as a relevant subtask and updating, as the relevant domain, the domain to which the relevant subtask belongs;
    referring to an action knowledge of the relevant domain out of action knowledges included in the respective multiple domains, and extracting a subtask completion flag or an action associated with the speech understanding result and the subtask; and
    causing the machine to execute the extracted action.

7. The method according to claim 6, wherein the subtask knowledge includes a knowledge about at least one subtask associated with the task and a knowledge about the domain associated with the subtask.

8. The method according to claim 6, wherein the outputting step includes the steps of:
    referring to a speech knowledge including a plurality of sentence patterns relevant to the corresponding domain, and calculating a degree of adaptation between the speech and each of the plurality of sentence patterns; and
    selecting the sentence pattern having a highest degree of adaptation, and outputting the selected sentence pattern and the degree of adaptation of the sentence pattern as a speech understanding result.

9. The method according to claim 8, wherein the selecting step includes the step of calculating a degree of reliability by multiplying the degree of adaptation by a weight set for each of the plurality of domains, and selecting the domain having a highest degree of reliability as the relevant domain.

10. The method according to claim 6, wherein the updating step includes the step of, when the subtask completion flag is extracted in the step of extracting an action or the subtask completion flag, updating a subsequent subtask of the relevant subtask in the sequence of subtasks as another relevant subtask and updating, as the relevant domain, the domain to which the another relevant subtask belongs.

11. A non-transitory computer readable medium storing a computer program for performing interaction between a user and a machine, the program causing a computer to perform the functions of:

recognizing a speech of the user from a signal detected by a microphone;
  delivering the speech of the user to a plurality of domains corresponding to multiple steps of the interaction with the user;
  understanding content of the speech in each of the plurality of domains and outputting a speech understanding result;
  receiving the speech understanding results respectively from the plurality of domains;
  selecting, as a relevant domain, the domain having an optimum speech understanding result out of the plurality of speech understanding results;
  referring to a task knowledge of the relevant domain out of task knowledges included in the respective multiple domains, and extracting a task associated with the speech understanding result;
  referring to a subtask knowledge including a plurality of subtasks associated with the kind of task, and determining a sequence of subtasks associated with the extracted task;
  determining a first subtask of the sequence of subtasks as a relevant subtask and updating, as the relevant domain, the domain to which the relevant subtask belongs;
  referring to an action knowledge of the relevant domain out of action knowledges included in the respective multiple domains, and extracting a subtask completion flag or an action associated with the speech understanding result and the subtask; and
  causing the machine to execute the extracted action,
  the program being recorded on a recording medium readable by the computer.

12. The non-transitory computer readable medium according to claim 11, wherein the subtask knowledge includes a knowledge about at least one subtask associated with the task and a knowledge about the domain associated with the subtask.

13. The non-transitory computer readable medium according to claim 11, wherein the outputting function includes the steps of:

referring to a speech knowledge including a plurality of sentence patterns relevant to the corresponding domain, calculating a degree of adaptation between the speech and each of the plurality of sentence patterns; and
  selecting the sentence pattern having a highest degree of adaptation, and outputting the selected sentence pattern and the degree of adaptation of the sentence pattern as a speech understanding result.

14. The non-transitory computer readable medium according to claim 13, wherein the selecting function includes the function of calculating a degree of reliability by multiplying the degree of adaptation by a weight set for each of the plurality of domains, and selecting the domain having a highest degree of reliability as the relevant domain.

15. The non-transitory computer readable medium according to claim 11, wherein the updating function includes the function of, when the subtask completion flag is extracted in the function of extracting an action or the subtask completion flag, updating a subsequent subtask of the relevant subtask in the sequence of subtasks as another relevant subtask, and updating, as the relevant domain, the domain to which the another relevant subtask belongs.

* * * * *